United States Patent
Ohkubo et al.

(10) Patent No.: US 7,190,642 B2
(45) Date of Patent: Mar. 13, 2007

(54) FOCUS SERVO DEVICE

(75) Inventors: Akinori Ohkubo, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 770 days.

(21) Appl. No.: 11/145,754

(22) Filed: Jun. 24, 2003

(65) Prior Publication Data
US 2005/0276175 A1 Dec. 15, 2005

(30) Foreign Application Priority Data
Jun. 25, 2002 (JP) .............................. 2002-185251

(51) Int. Cl.
*G11B 7/00* (2006.01)
(52) U.S. Cl. .................................. 369/44.11; 369/53.28
(58) Field of Classification Search ..................... None
See application file for complete search history.

(56) References Cited

U.S. PATENT DOCUMENTS 6,567,353 B1 * 5/2003 Kubo et al. .............. 369/44.23

FOREIGN PATENT DOCUMENTS

| JP | 5-120698 | 5/1993 |
| JP | 8-147715 | 6/1996 |
| JP | 8-315370 | 11/1996 |

* cited by examiner

*Primary Examiner*—Paul Huber
(74) *Attorney, Agent, or Firm*—Drinker Biddle & Reath LLP

(57) ABSTRACT

A focus servo device is for focusing a light irradiated from a light source onto a recording medium surface via an objective lens. Assuming that a wavelength of the light is $\lambda$, a numerical aperture of the objective lens is NA, an average run length period of the recording medium standardized with $\lambda/NA$ is RL, the track pitch standardized with $\lambda/NA$ is TP, and the capture range of said focus servo device is CR [$\mu$m], the following equation applies:

$$0.114/(RL-0.72)+0.84 \leq CR \leq 18000(TP-0.69)^5+3.13.$$

5 Claims, 9 Drawing Sheets

FOCUS SERVO DEVICE

BACKGROUND OF THE INVENTION

1. Field of the Invention

The present invention relates to a focus servo device in an optical disc recording/reproducing apparatus, and more particularly to the focus servo device provided with a capture range based on an analysis of a lead-in range of focus servo.

2. Description of the Related Art

A focus-error detection system of the focus servo in a conventional optical disc recording/reproducing apparatus is basically designed to increase the sensitivity of the focus-error detection and thereby to extend a range of the focus-error detection. However, in this design, there are the restrictions of the capture range (which is referred to as the "CR" in this application as occasion demands) of the focus servo as described below.

Firstly, it is necessary for the focus servo to detect the deviation of the focus position caused by an external disturbance and keep the deviation of the focus position within the depth of focus by using an actuator.

Regarding to this, according to the standard of a DVD, the focus servo is defined such that the amount of surface-runout or surface-wobble of the disc is at most plus or minus ($\pm$) 0.3 mm and such that the focus position is within a range of $\pm 0.23$ μm, which is the depth of focus to allow the obtaining of a good reproduction signal. Therefore, the focus-error detection range needs to be at least $-0.23$ μm or less, or $+0.23$ μm or more; otherwise there is a possibility that the focus will be off. Generally, the focus-error detection range is about ½ of the CR in a linear region of a focus-error signal (FES) of S-curve.

Therefore, the lower limit of the CR is as follows:

$$CR \text{ lower limit}_{DVD} \geq 0.23 \times 2 \times 2 = 0.92 \text{ [μm]}.$$

Moreover, such a method has been taken that the CR of the focus servo in considering a multi-layered disc is ¼ of an interlayer thickness or less, as disclosed in Japanese Patent Application Laying Open NO. Hei. 8-315370, for example. Applying this method to a DVD with Numerical Aperture (NA) 0.6, for example, since a thickness between two layers is defined to be about 55 μm in the DVD standard, the following expression applies:

$$CR \text{ upper limit}_{DVD} \leq 55/4 = 13.75 \text{ [μm]}.$$

Taking a Blu-ray Disc (BD) for an example, which has a further increased recording capacity, since a focus residual of $\pm 0.23$ μm defined by the DVD is converted into $\pm 0.07$ μm using a ratio of the depth of focus $\propto$ (NA$^2$), the CR needs to be $0.07 \times 2 \times 2 = 0.28$ μm or more. Considering the multi-layered disc, since the interlayer thickness of the DVD is converted into about 17 μm using the ratio of the depth of focus $\propto$ ($\lambda$/NA$^2$), the CR needs to be $17/4 = 4.25$ μm or less. Thus, the CR range in the focus-error detection system is as follows:

$$0.28 \text{ [μm]} \leq CR_{BD} \leq 4.25 \text{ [μm]}.$$

In the DVD, for example, the defocus margin, the focus close position of the focus servo, or the like have never been considered because the tilt tolerance has more effect on the reproduced signal than the defocus tolerance does.

Shown in FIG. 1 is the comparison of a wavefront aberration RMS (Root Means Square) value [$\lambda$] generated by the defocus in the DVD with that of the BD. FIG. 1 teaches that the BD has a larger effect of the defocus on the aberration value than the DVD does. With respect to a wavefront aberration RMS value [$\lambda$] generated by the tilt, the DVD and the BD have the substantially same aberration value, as shown in FIG. 2.

Therefore, if the numerical aperture NA of an object lens is increased more than that of the conventional DVD and a light source wavelength $\lambda$ is shorten in order to make the recording capacity as large as that of the BD, the defocus has an increased effect on the reproduction signal, so that the defocus margin becomes important in determining system margin.

In this case, as is conventionally done, if the CR of the focus servo, i.e. the focus close position, is not considered, the focus servo may close at a position deviating widely from the above-described optimum focus position. On that account, the defocus margin may decrease, which causes a possibility that the system does not function.

SUMMARY OF THE INVENTION

It is therefore an object of the present invention to provide a focus servo device for an optical disc reproducing apparatus, having a capture range of focus servo determined for establishing a stable system in an optical disc, in which the numerical aperture NA of an object lens is increased and a light source wavelength $\lambda$ is shorten so as to increase the recording capacity of the optical disc.

The above object of the present invention can be achieved by a focus servo device for focusing a light irradiated from a light source onto a recording medium surface via an objective lens, wherein a capture range to lead in focus is determined from: a lower limit determined on the basis of an average run length period; and an upper limit determined on the basis of a track pitch.

According to the focus servo device of the present invention, with respect to the capture range to lead-in focus, its upper limit is determined by the condition of the track pitch, while its lower limit is determined by the condition of the average run length period. By assuming that a range determined by the conditions is the capture range, it is possible to close the focus in a range in which enough defocus margin can be obtained with respect to an optical recording medium of high-recording-density and high-recording capacity, which uses a pickup optical system having a high NA and a light source giving short-wavelength light.

In one aspect of the focus servo device of the present invention, assuming that a wavelength of the light is $\lambda$, a numerical aperture of the objective lens is NA, the average run length period of the recording medium standardized with $\lambda$/NA is RL, the track pitch standardized with $\lambda$/NA is TP, and the capture range of the focus servo device is CR [μm], the following equation applies:

$$0.114/(RL-0.72)+0.84 \leq CR \leq 18000(TP-0.69)^5+3.13.$$

According to this aspect, it is shown that the capture range is specifically a range between $0.114/(RL-0.72)+0.84$ and $18000 (TP-0.69)^5+3.13$.

In another aspect of the focus servo device of the present invention, the following equation applies for the average run length period RL:

$$RL=2 \times \{\text{integer part of } [(\text{average data inversion interval/channel bit length})+0.5]\} \times \text{channel bit length} \times NA/\lambda.$$

According to this aspect, it is shown that the average run length period RL is $2 \times \{$integer part of $[($average data inversion interval/channel bit length$)+0.5]\} \times$ channel bit length$\times$ NA/$\lambda$. This run length period is one factor in determining the specific range of the capture range. Incidentally, this aspect means to include not only that the left side in the above equation, "the average run length period RL", completely corresponds to the right side, "2×{integer part of [(average data inversion interval/channel bit length)+0.5]}×channel bit length×NA/λ", but also that the left side substantially corresponds to the right side under a condition that the enough focus margin can be obtained.

In another aspect of the focus servo device of the present invention, the wavelength λ of the light ranges from 0.395 to 0.415 μm and the numerical aperture NA of the objective lens ranges from 0.80 to 0.90. Moreover, if the standardized track pitch TP is 0.6 or more and the average run length period RL is 0.86 or more, the following equation applies: $1.65 \leq CR \leq 3.02$.

According to these aspects, it is possible to determine the capture range of the pickup with respect to an optical recording medium of high-recording-density and high-recording capacity, which uses a light source giving a short-wavelength light and which has a high NA.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

If a high NA objective lens and a short-wavelength laser diode (LD) are used as with the BD, for example, the aberration value obtained by the defocus increases more than that of the conventional DVD or the like, as described above. In this case, the defocus margin is dominant in the stability of a BD apparatus. Moreover, it has been found that the phenomena described below in (1) and (2) occur if there is a spherical aberration, so that it is necessary to define the capture range of the focus servo for ensuring reproduction performance of the BD apparatus.

(1) If there is the spherical aberration, the focus close position (a zero point in the S-curve) has a capture range dependency. Therefore, the focus close position can be represented as a function of the CR as in (A).

$$\text{focus close position (CR)} \quad\quad\quad (A)$$

(2) If there is the spherical aberration, the shape of a reproduction beam on the disc varies depending on the defocus direction, so that there are different main factors in the deterioration of the reproduction signal as described below.

Firstly, in the positive direction (in which the disc and the objective lens move away from each other), the increase of the crosstalk is a main factor in the deterioration of the reproduction signal. Therefore, the crosstalk can be represented as a function of the track pitch (TP) as in (B).

$$\text{crosstalk (TP)} \quad\quad\quad (B)$$

Secondly, in the negative direction (in which the disc and the objective lens approach), the deterioration of signal amplitude is a main factor in the deterioration of the reproduction signal. Therefore, the signal amplitude can be represented as a function of the standardized average run length period or cycle (RL) as in (C).

$$\text{signal amplitude (RL)} \quad\quad\quad (C)$$

From these functions (A), (B), and (C), it is possible to set a range of the capture range in which the stable reproduction signal can be obtained. The standardized average run length period will be explained later with reference to FIG. 10.

(Embodiment)

Figure 1:
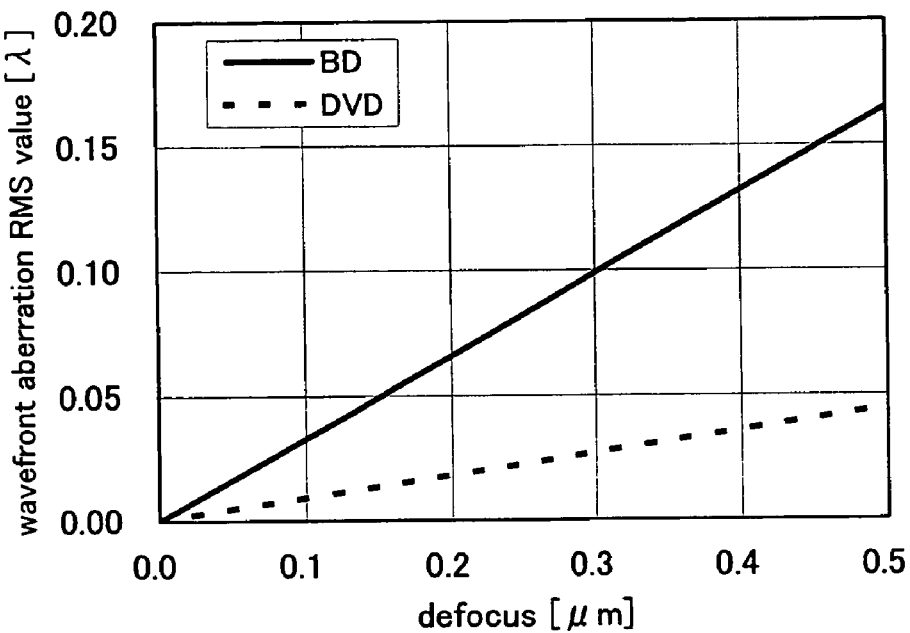
FIG. 1 is a graph showing the relationship between defocus and generated aberration values.
Figure 2:
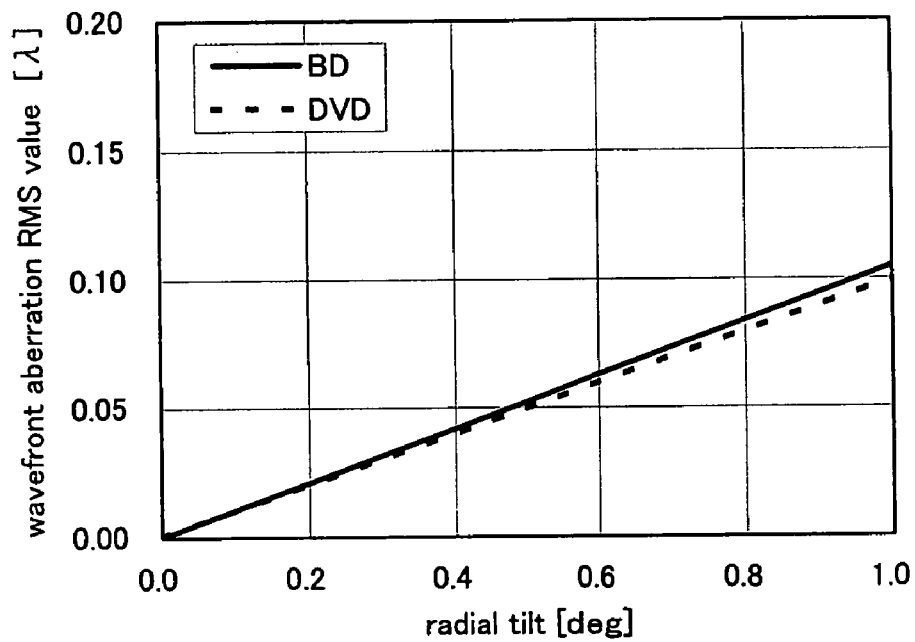
FIG. 2 is a graph showing the relationship between tilt and generated aberration values.
Figure 3:
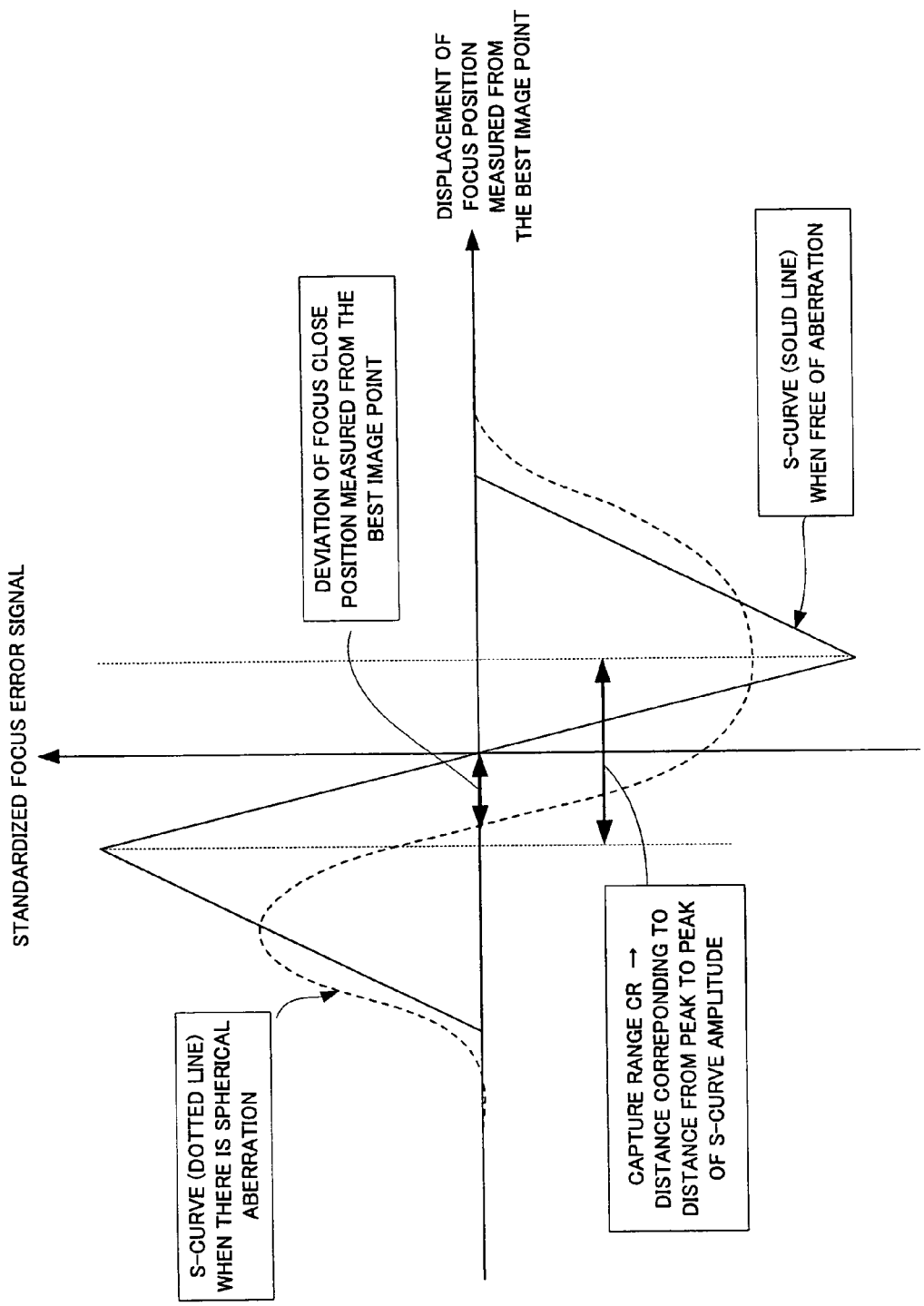
FIG. 3 is a schematic diagram showing the relationship between a focus-error signal and a capture range.
Figure 4:
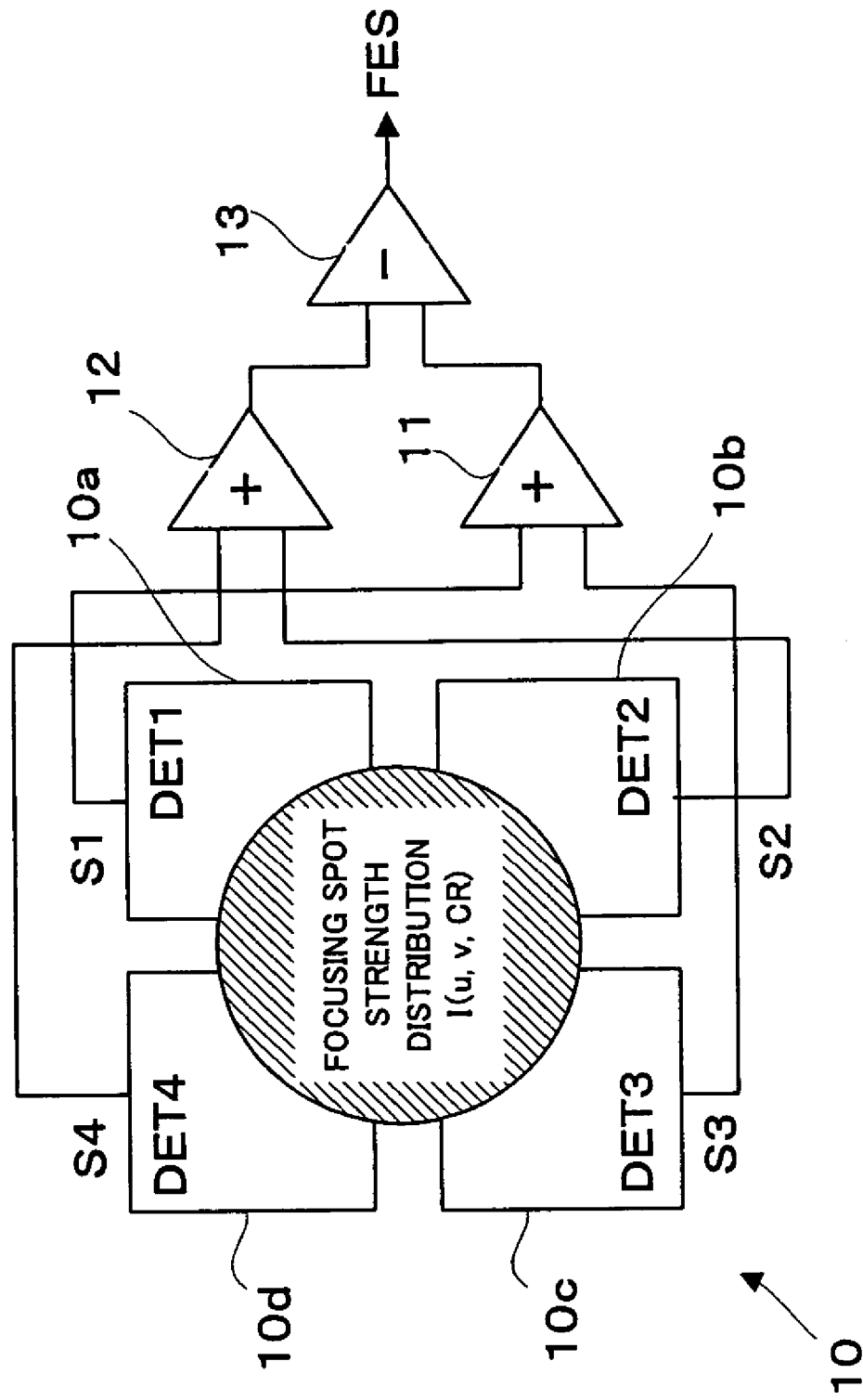
FIG. 4 is a schematic diagram showing a calculation method of the focus-error signal using an astigmatism method.
Figure 5:
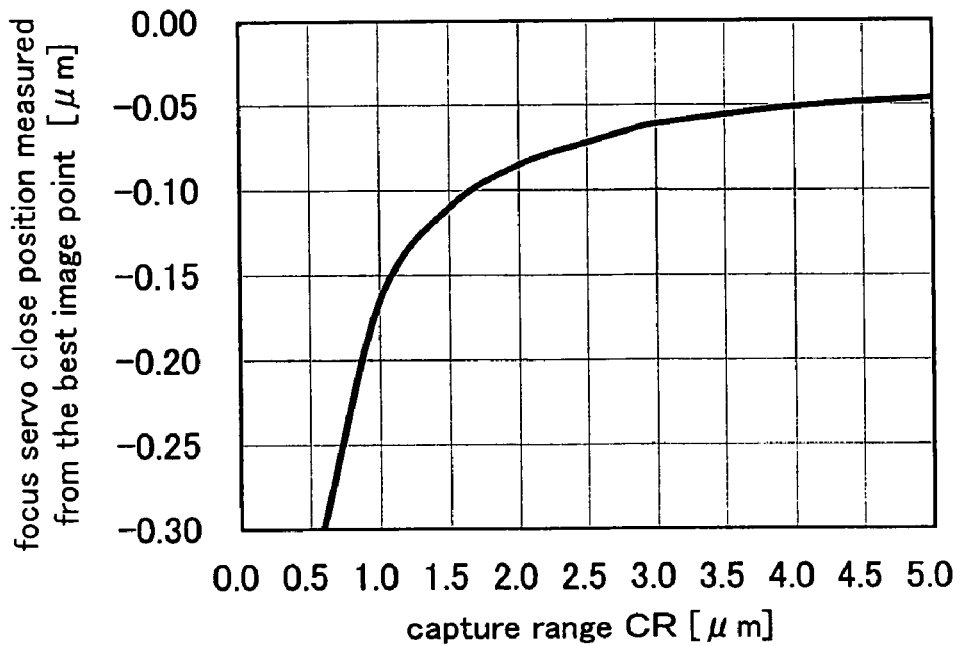
FIG. 5 is a graph showing the capture range dependency of focus servo close positions.
Figure 6:
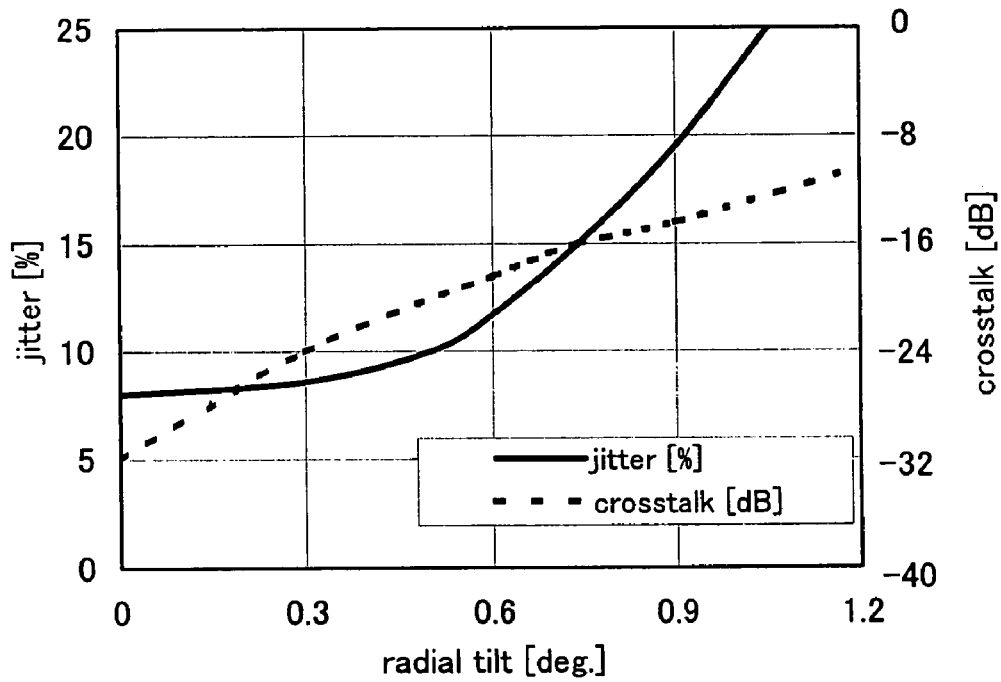
FIG. 6 is a graph showing threshold values of the objective function of crosstalk.
Figure 7:
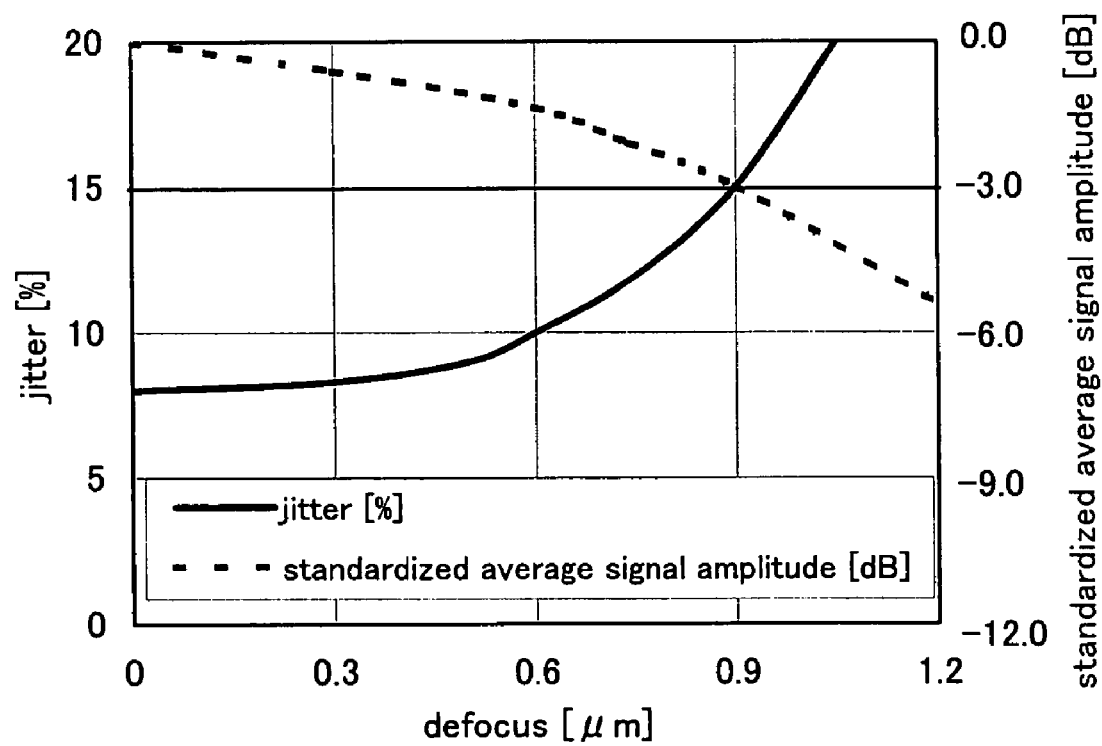
FIG. 7 is a graph showing threshold values of the objective function of standardized average signal amplitude.
Figure 8:
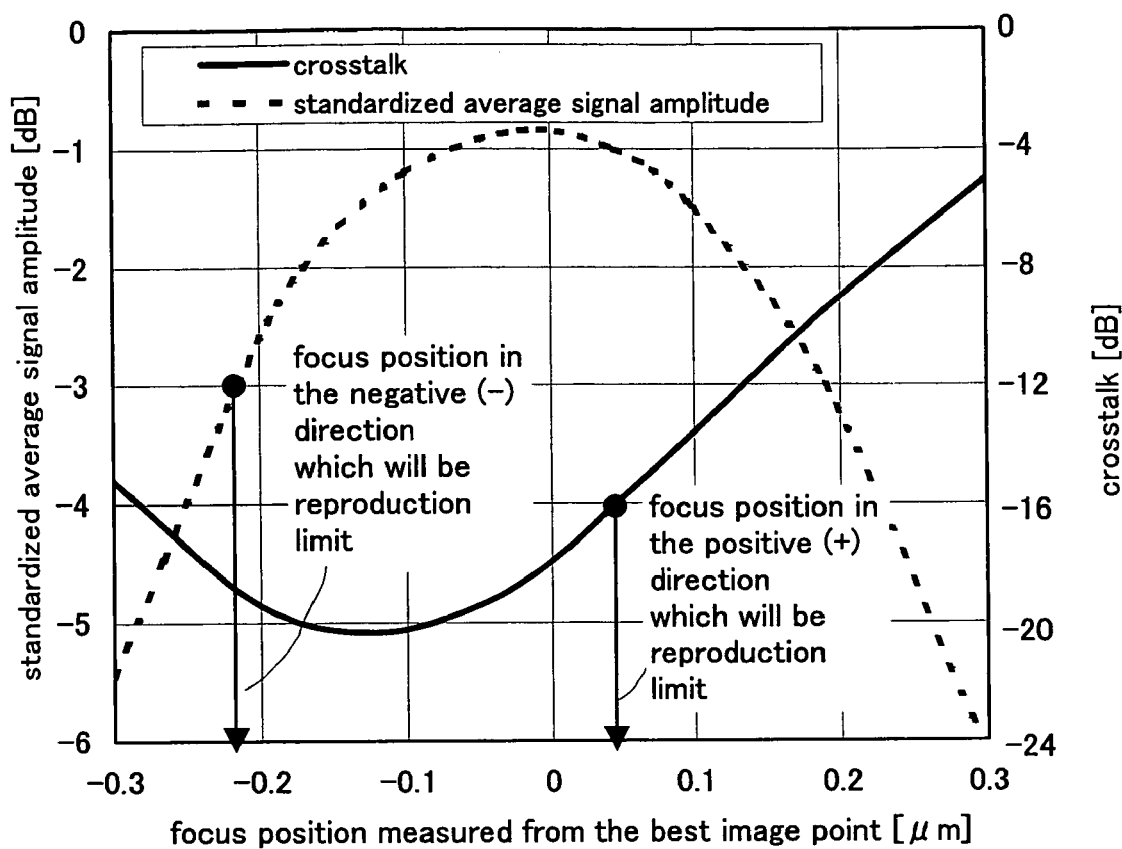
FIG. 8 is a schematic diagram showing the relationship between the crosstalk and the deterioration of the signal amplitude.
Figure 9:
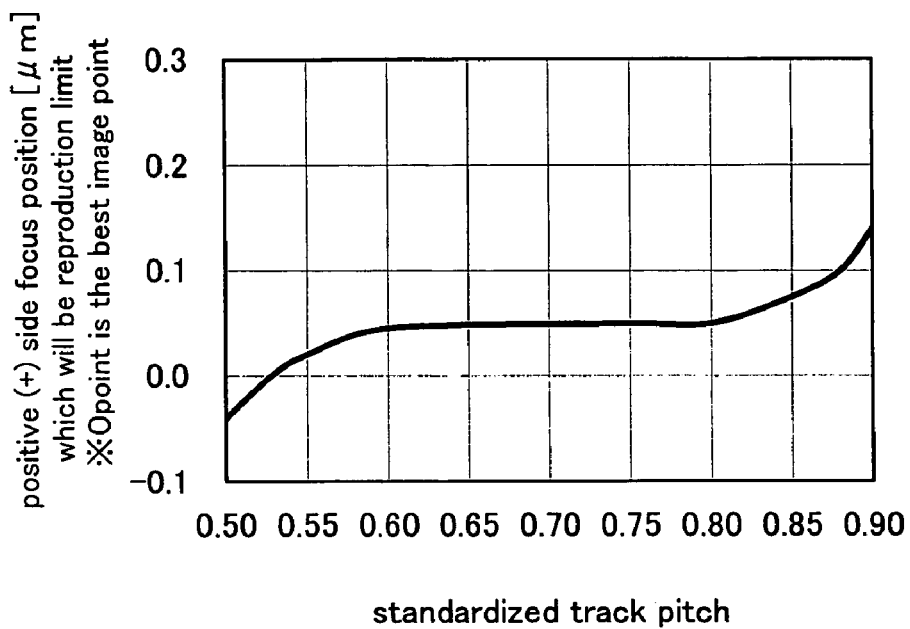
FIG. 9 is a graph showing the standardized track pitch dependency of positive (+) side focus positions which will be reproduction limits.
Figure 10:
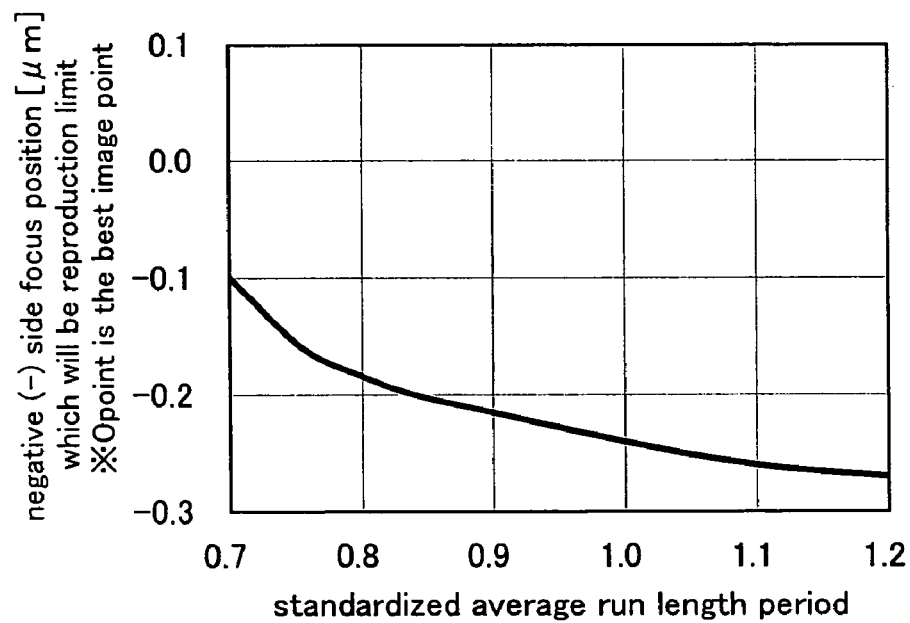
FIG. 10 is a graph showing the standardized average run length period or cycle dependency of negative (−) side focus positions which will be reproduction limits.
Figure 11:
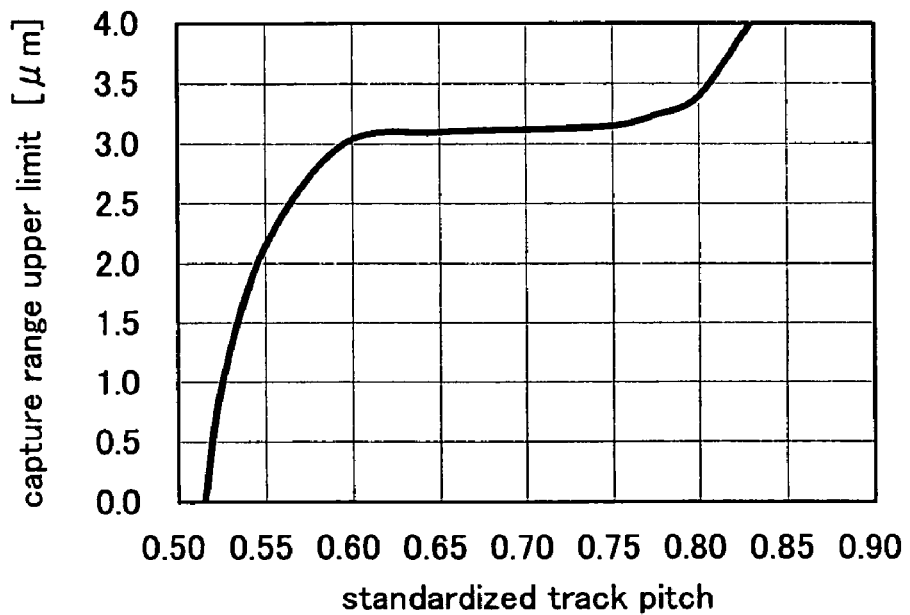
FIG. 11 is a graph showing the upper limit values of the capture range.
Figure 12:
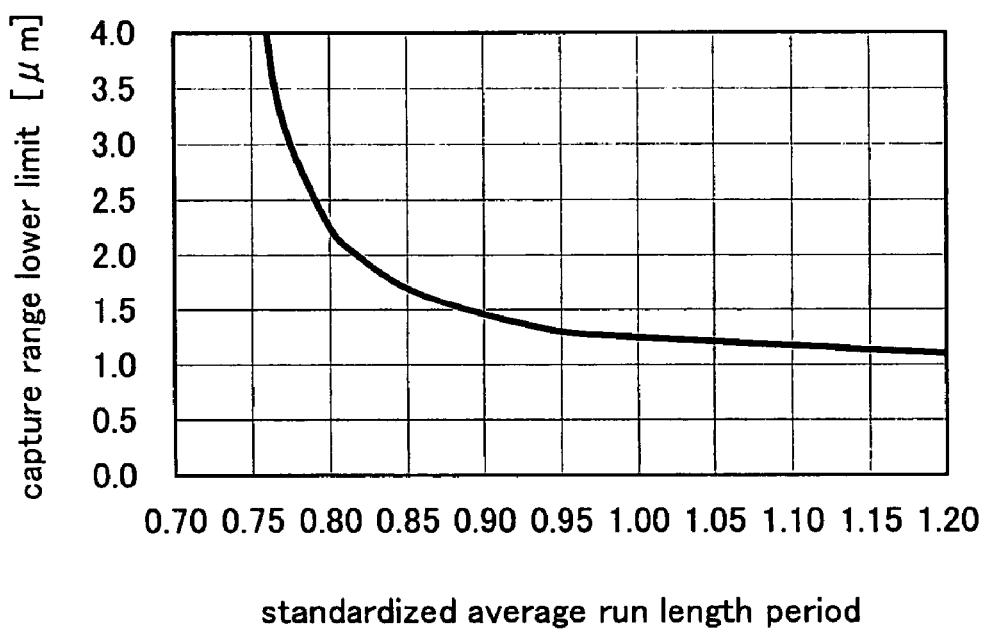
FIG. 12 is a graph showing the lower limit values of the capture range.

An embodiment will be explained with reference to FIG. 3 to FIG. 12. FIG. 3 is a schematic diagram showing the relationship between a focus-error signal and a capture range. FIG. 4 is a schematic diagram showing a calculation method of the focus-error signal using an astigmatism method. FIG. 5 is a graph showing the capture range dependency of the focus servo close position. FIG. 6 is a graph showing the threshold value of the objective function of crosstalk. FIG. 7 is a graph showing the threshold value of the objective function of standardized average signal amplitude. FIG. 8 is a schematic diagram showing the relationship between the crosstalk and the deterioration of the signal amplitude. FIG. 9 is a graph showing the standardized track pitch dependency of the positive side focus position which will be reproduction limits. FIG. 10 is a graph showing the standardized average run length period or cycle dependency of the negative side focus position which will be reproduction limits. FIG. 11 is a graph showing upper limit values of the capture range. FIG. 12 is a graph showing lower limit values of the capture range.

(Study About Focus Servo Close Position)

Generally, the focus error signal (FES) can be obtained by integrating a beam spot strength distribution I (u, v) on a detector. Here, I (u, v) is a reproduction beam spot strength distribution on the detector and can be represented by an equation (1) by wave optics. Incidentally, u and v are coordinates on the detector, and x and y are coordinates on a pupil.

$$I(u, v) = \left| \int\int_{-\infty}^{+\infty} \tau(x, y) \cdot \exp[i2\pi\{ux+vy+w_{in}(x, y)\}] \, dxdy \right|^2 \quad\quad (1)$$

Here, $\tau(x, y)$: an aberration-free incident light  (2), $w_{in}(x, y)$: a wavefront on an exit pupil  (3), and $w_{out}(x, y)$: a wavefront generated between the exit pupil and the detector.  (4).

A wavefront aberration $w(x, y)$ can be represented by an equation (5) by geometrical optics using a Zernike polynomial $U_{nm}$, an aberration coefficient $A_{nm}$, and a wavefront analysis equation of the defocus $W_{def}(x, y)$.

$$w(x, y) = \sum_n \sum_m A_{nm} U_{nm} + W_{def}(x, y) \quad (5)$$

Here, n and m are integers which are not negative, $n \geq m$, n−m is an even number, and $A_{nm}$ is a constant. Moreover, the aberration characteristics depend on the values of n and m. For example, the following applies:

(n, m)=
(2, 1): defocus
(2, 2): astigmatism (three-dimensional)
(2, 0): astigmatism (three-dimensional)
(3, 2): coma aberration (three-dimensional)
(3, 1): coma aberration (three-dimensional)
(4, 2): spherical aberration (three-dimensional)

Taking it as an example to explain a Blu-ray Disc (BD) with the recording capacity 27 GB, which is described in NIKKEI ELECTRONICS No. 817 and the like, the track pitch TP is 0.32 μm and the shortest recording mark length is 0.138 μm in this disc.

Incidentally, this disc system has the storage capacity about 5.7 times as large as that of a disc having a storage capacity of 4.7 GB per one layer on one side of the DVD, for example, so as to record a two-hour or longer digital high vision broadcast. In order to realize this large recording capacity, the numerical aperture NA of the objective lens constituting a pickup is set higher and the light source wavelength λ is set shorter.

On that account, even in the same defocus amount, the defocus gives an effect on the deterioration of the recording signal in the BD more severely than in the DVD, resulting that the defocus margin gets in a more difficul condition. Therefore, the focus position at which the focus servo closes (i.e., the focus close position) becomes important for the stability of the disc system.

(Study About How to Obtain Focus Close Position)

The focus close position is a focus position at which the FES is zero. The concept of the S-curve of the FES is shown in FIG. 3. As shown in FIG. 3, the capture range is determined to be a distance of the focus positions corresponding to the peak to peak (P—P) of the S-curve amplitude. Generally, when the spherical aberration is generated, its S-curve's shape is different from that in the aberration-free case, so that the focus close position measured from the best image point is different from that in the aberration-free case, which is shown in FIG. 3.

Now, the focus close position at which there is the spherical aberration in the positive (+) polarity (in such a direction that the thickness of a transmission layer increases) is studied.

As described above, the focus close position is a focus position at which the FES obtained by calculating the reproduction beam spot strength distribution in the equation (1) is zero. If there is the aberration, $w_{in}(x, y)$ and $w_{out}(x, y)$ in the equation (1) will have values other than zero.

If there is a thickness error of the transmission layer as the spherical aberration, using the above-described Zernike polynomial $U_{nm}$ and the aberration coefficient $A_{nm}$, $w_{in}(x, y)$ in the equation (3) will have terms of $A_{21}U_{21} + A_{42}U_{42} + A_{63}U_{63} + A_{84}U_{84} + \ldots$, and under the defocus condition, $w_{in}(x, y)$ will have a term of $W_{def}(x, y)$. Therefore, the equation (3) can be represented by an equation (6).

$$w_{in}(x, y) = A_{21}U_{21} + A_{42}U_{42} + A_{63}U_{63} + A_{84}U_{84} + W_{def}(x, y) \quad (6)$$

Incidentally, $A_{nm}$ and $U_{nm}$ corresponding to the spherical aberration in the above equation can be represented by the following equations (7) and (8) if n=8 and m=4 are even considered.

$$A_{21} = \frac{NA^4}{20480n^{11}\lambda} \times \quad (7)$$
$$\{1280n^8 + 576n^6NA^2 + 320n^4NA^4 + 200n^2NA^6 + 135NA^8 - n^{10}(1280 + 576NA^2 + 320NA^4 + 200NA^6 + 135NA^8)\}\Delta T$$

$$A_{42} = \frac{NA^4}{86016n^{11}\lambda} \times \{1792n^8 + 1344n^6NA^2 + 960n^4NA^4 + 700n^2NA^6 + 525NA^8 - n^{10}(1792 + 1344NA^2 + 960NA^4 + 700NA^6 + 525NA^8)\}\Delta T$$

$$A_{63} = \frac{NA^6\{288n^6 + 360n^4NA^2 + 350n^2NA^4 + 315NA^6 - n^8(288 + 360NA^2 + 350NA^4 + 315NA^6)\}\Delta T}{92160n^{11}\lambda}$$

$$A_{84} = \frac{NA^8\{88n^4 + 154n^2NA^2 + 189NA^4 - n^{10}(88 + 154NA^2 + 189NA^4)\}\Delta T}{157696n^{11}\lambda}$$

$U_{21} = 2t^2 - 1$ $U_{42} = 6t^2 - 6t + 1$ $U_{63} = 20t^3 - 30t^2 + 12t - 1$ $U_{84} = 70t^4 - 140t^3 + 90t^2 - 20t + 1 \quad (8)$ In the equation (7), NA is the numerical aperture of the objective lens, n is the refractive index of the transmission layer, λ is the light source wavelength [μm], and ΔT is the thickness error of the transmission layer [μm]. With respect to the polarity of the thickness error, a direction in which the thickness increases is regarded as positive. Moreover, t in the equation (8) satisfies $t = x^2 + y^2$.

$W_{def}(x, y)$ corresponding to the defocus can be represented by equations (9) and (10).

$$w_{def}(x, y) = \frac{\left(1 - \sqrt{1 - NA^2 t}\right)}{\lambda} \cdot (defocus + defocus_0) \quad (9)$$

$defocus_0$ = the amount of focus shift moved to minimize the RMS value [μm]  (10)

Here, the defocus in the equation (9) is the amount of defocus [μm] measured from the best image point in air, and with respect to the polarity of the defocus, a direction in which the objective lens and a recording surface move away from each other is regarded as positive.

In a focusing optical system until reaching to the detector, the spherical aberration having the same amount of the above-described win (x, y) is given. Moreover, if the astigmatism method is used for the focus error signal detection, for example, the astigmatism in the ±45 degree direction is generated and a corresponding term $W_{as}$ (x, y, CR) is given, so that $w_{out}$ (x, y) can be represented by an equation (11).

$$w_{out}(x, y) = w_{in}(x, y) + W_{as}(x, y, CR) \quad (11)$$

Here, $W_{as}$(x, y, CR) can be represented by an equation (12).

$$W_{as}(x, y, CR) = NA^2/\lambda \cdot CR \cdot xy \quad (12)$$

As learned from the equations (11) and (12), $w_{out}$(x, y) can be represented as a function of CR as shown in an equation (13).

$$w_{out}(x, y) = w'_{out}(x, y, CR) \quad (13)$$

Therefore, the equation (1) can be represented by an equation (14), and thus I (u, v) is found to be a function depending on CR.

$$I(u, v) = I(u, v, CR) = \left| \iint_{-\infty}^{+\infty} \tau(x, y) \cdot \exp[i2\pi\{ux + vy + w_{in}(x, y) + w'_{out}(x, y, CR)\}] dx dy \right|^2 \quad (14)$$

With respect to the FES in the astigmatism method which uses a four-division detector 10, as shown in FIG. 4, the FES can be obtained by calculating (S1+S3)−(S2+S4) at a subtracter 13 from (S1+S3) calculated at an adder 11 and (S2+S4) calculated at an adder 12 using values (S1 to S4) detected at relative detection elements 10a to 10d for detecting I (u, v, CR). The focus position at which the FES obtained in the above manner is zero will be the close position of the focus servo, and thus it is found that the focus servo close position has a CR dependency.

As the amount of spherical aberration assumed in the BD, the thickness dispersion of a transmission layer in the disc surface is expected to be about ±3 μm in an optical disc with the 0.1 mm transmission layer (a cover layer), which is as in the BD, according to this literature Jpn. J. Phys. Vol. 39 (2000) pp 775–778. In addition, the RMS value of residual spherical aberration of the objective lens and other optical systems is about 20 mλ, and this spherical aberration amount is converted into a thickness error of about ±2 μm. Thus, as the worst condition, it is assumed that the spherical aberration is 5 μm in the equivalent of the thickness error.

Therefore, if ΔT=+5 [μm] in the equation (7), a function indicating the CR dependency of the focus servo close position can be obtained by calculating the equation (14), and can be represented by the following approximation function in an equation (15).

$$fclose(CR) = -0.29/(CR+0.5)^2 - 0.038 \text{ [μm]} \quad (15)$$

FIG. 5 shows an expansion of the equation (15) to an illustration, wherein the vertical axis is the focus servo close position [μm] and the horizontal axis is the capture range [μm]. The zero point in FIG. 5 is the best image point.

(Study About Objective Functions of Factors in the Deterioration of Reproduction Signal)

Next, the factors in the deterioration of the reproduction signal are studied in order to obtain the focus position which will be the reproduction limit. As the factors in the deterioration of the reproduction signal, there are assumed the increase of the crosstalk and the deterioration of the signal amplitude. The objective functions representing the relative characteristics are as follows.

(i) Crosstalk Objective Function

The crosstalk is generated by a signal from an adjacent track leaking into a signal of a reproduction track. Here, the crosstalk amount varies along with the track pitch TP and can be represented by an equation (16).

Crosstalk (TP)=light intensity on the adjacent track/ light intensity on the reproduction track [dB]   (16)

The above equation is specifically a function represented by an equation (17).

$$ct(TP) = \frac{2 \times \int_{\text{Adjacent\_Track}} \int_{-\infty}^{\infty} \left| \int_{-\infty}^{\infty} \int_{-\infty}^{\infty} f(x, y) \exp[i2\pi(u'x + v'y)] dx dy \right|^2 du' dv'}{\int_{\text{Main\_Track}} \int_{-\infty}^{\infty} \left| \int_{-\infty}^{\infty} \int_{-\infty}^{\infty} f(x, y) \exp[i2\pi(u'x + v'y)] dx dy \right|^2 du' dv'} \quad (17)$$

Here, u' and v' are coordinates on the disc standardized with λ/NA, where v' is the one in the radial direction and u' is the one in the tangential direction. In the equation (17), the integration range in the numerator (Adjacent_Track) is a radial-direction range corresponding to the adjacent track, and the integration range in the denominator (Main_Track) is a radial-direction range corresponding to the reproduction track. Moreover, f (x, y) is a complex amplitude distribution on the exit pupil and can be represented by an equation (18) using the equations (2) and (3).

$$f(x, y) = \tau(x, y) \exp\{i2\pi \cdot w_{in}(x, y)\} \quad (x^2 + y^2 \leq 1) \quad (18)$$
$$= 0 \quad (x^2 + y^2 > 1)$$

(ii) Signal Amplitude Objective Function

What influences the deterioration of the signal amplitude is the deterioration of a MTF (Modulation Transfer Function). Here, the standardized average run length period RL is defined as an equation (19) and the MTF at a frequency corresponding to the period is used to represent the objective function of the signal amplitude. Incidentally, [x] means a maximum integer not greater than x. An average data inversion interval is an interval represented by a distance in which 1 and 0 of the data are inverted if the reproduction signal is binarized.

standardized average run length period RL=2×{integer part of [(average data inversion interval/ channel bit length)+0.5]}×channel bit length× NA/λ   (19)

Assuming that a standardized frequency s corresponding to the standardized average run length period RL is represented by an equation (20), the MTF can be represented by an equation (21). Here, f* is a complex conjugate function.

s=1/standardized average run length period   (20)

$$fmtf(s) = \frac{\left|\int\int_{-\infty}^{+\infty} f(x+s, y)f^*(x, y)dxdy\right|}{\int\int_{-\infty}^{+\infty}|f(x, y)|^2 dxdy} \quad (21)$$

Using the above equation, a function of the signal amplitude can be represented by an equation (22).

standardized average signal amplitude $(s)=fmtf(s)$ in considering the aberration/$fmtf(s)$ when free of the aberration [dB] (22)

(Specific Example)

A specific example in which these objective functions of the crosstalk and the signal amplitude are applied to an optical disc of the Blu-ray Disc having a 27 GB recording capacity will be explained.

A threshold value obtained when the value of each objective function becoming the reproduction limit is basically taken as a value at which jitter is 15% when a scalar diffraction simulation is performed using parameters of the DVD.

Since the crosstalk is mainly generated by the radial tilt (i.e., the tilt in the radial direction), it is studied with increasing the radial tilt. As a result, as shown in FIG. 6, the jitter is 15% when the radial tilt is 0.75 degrees, and the crosstalk objective function at this time is −16 dB.

The signal amplitude is studied with the defocus. The reason of using the defocus is that the use of tangential tilt (i.e., the tilt in the tangential direction) may influence the phase shift in the reproduction signal and thus the deterioration of the signal amplitude cannot accurately represent the deterioration of the reproduction signal. If it is defocused, the crosstalk also occurs, but the evaluation is performed in the condition that its track pitch is broader than that of the DVD, thereby reducing the influence of the crosstalk. In this case, the jitter is 15% when the defocus is 0.9 μm as shown in FIG. 7. At this time, the signal amplitude objective function is −3 dB.

Thus, by obtaining the focus positions when the crosstalk objective function and the signal amplitude objective function take the threshold values as shown in FIG. 6 and FIG. 7, respectively, the focus positions which will be the reproduction limits can be obtained.

In the optical disc of the Blu-ray Disc having a 27 GB recording capacity, the track pitch TP is 0.32 μm and the shortest recording mark length $T_{min}$ is 0.138 μm. In this case, a standardized TP is 0.672 and the standardized average run length period RL is 0.868 because it is based on 17 PP as an encoding method. In this case, changing the focus position and evaluating the crosstalk and the signal amplitude with the equations (17) and (22) give the result shown in FIG. 8. FIG. 8 teaches that the focus positions which will be the reproduction limits can be shown in equations (23) and (24).

reproduction limit focus position in the positive(+) direction=0.05 μm (23)

In this case, the crosstalk increase is a dominant factor.

reproduction limit focus position in the negative(−) direction=−0.21 μm (24).

In this case, the deterioration of the signal amplitude is a dominant factor.

This result teaches that the factor in determining the focus position of the reproduction limit varies along with the focus direction.

Using the focus position which will be the reproduction limit as obtained above, it is possible to obtain the stably reproducible optimum focus servo close position. Therefore, if using the focus servo having a CR which enables the focus to close at this optimum focus servo close position, it is possible to obtain the stable reproduction signal and prevent the deviation of the focus servo.

Next, on the basis of the above-described condition, the specific value of the capture range will be obtained. About 0.11 μm defocus margin is required between the focus position of the reproduction limit and the optimum focus servo close position. The details are a servo residual 0.04 μm, an offset of an electric system 0.02 μm, and a pickup adjustment error 0.05 μm, and the total is 0.11 μm.

The defocus margin estimated from the reproduction limit focus position in the equation (23) is −0.06 μm. Substituting this into the equation (15) gives a CR value of 3.13 μm corresponding to the reproduction limit in the position (+) direction. This value is the upper limit of the CR. In the same manner, the defocus margin estimated from the reproduction limit focus position in the equation (24) is −0.10 μm. Substituting this into the equation (15) gives a CR value of 1.66 μm corresponding to the reproduction limit in the negative (−) direction. This value is the lower limit of the CR. Therefore, the CR range can be represented by an equation (25).

$$1.66 \leq CR[\mu m] \leq 3.13 \quad (25)$$

Designing the focus servo to be in a range in which the CR satisfies the equation (25) makes it possible to close the focus servo at the focus position at which the stable reproduction signal can be obtained, thereby allowing a stable recording/reproducing system of the optical disc.

So far, the CR in the optical disc of the Blu-ray Disc having a 27 GB recording capacity has been explained. This CR can be represented by a function of the track pitch or the standardized average run length period, and next will be their explanations.

As described above, the focus position which will be the reproduction limit in the positive direction has a track pitch dependency because the crosstalk is a dominant factor, and it can be represented by an approximate function in an equation (26) with the standardized track pitch TP, which is standardized with λ/NA, as a parameter. FIG. 9 is an illustration of the equation (26), and the 0 point is the best image point in FIG. 9.

$$focus_+(TP)=280(TP-0.7)^5+0.05 \, [\mu m] \quad (26)$$

With respect to the focus position [μm] which will be the reproduction limit in the negative direction, because the deterioration of the signal amplitude is a dominant factor, it can be represented by an approximate function in an equation (27) with the standardized average run length period RL, which is standardized with λ/NA, as a parameter. FIG. 10 is an illustration of the equation (27), and the zero point is the best image point in FIG. 10.

$$focus_-(RL)=0.054/(RL-0.45)-0.34 \, [\mu m] \quad (27)$$

Here, since the required defocus margin described above is 0.11 μm, a possible range that the CR value [μm] can take and in which the required defocus margin can be ensured, can be represented by an equation (28) using the equations (15), (16), and (27).

$$focus_-(RL)+\text{Margin} \leq fclose(CR) \leq focus_+(TP)-\text{Margin} \quad (28)$$

Therefore, the CR range satisfying a relational expression of an equation (29) may be chosen.

$$0.054/(RL-0.45)-0.23 \leq 0.29/(CR+0.5)^2-0.038 \leq 280(TP-0.7)^5-0.06 \quad (29)$$

By obtaining the CR [μm] which satisfies this relational expression, it is possible to obtain the upper limit value of the capture range for the standardized track pitch as shown in FIG. 11 and the lower limit value of the capture range for the standardized average run length as shown in FIG. 12. Using functions of the upper limit value and the lower limit value of the CR gives the CR range represented by an equation (30).

$$CR \text{ lower limit value } (RL) \leq CR \leq CR \text{ upper limit value } (TP) \quad (30)$$

Moreover, the equation (30) can be represented by an equation (31) using approximate functions of the upper limit value and the lower limit value of the CR derived from the equation (29).

$$0.114/(RL-0.72)+0.84 \leq CR[\mu m] \leq 18000(TP-0.69)^5+3.13 \quad (31)$$

Therefore, by choosing the CR value so as to be within a range satisfying the equation (29) or a range satisfying the equation (31), it is possible to realize the focus servo for ensuring reproduction performance.

In the Blu-ray system, the light source wavelength λ is applied in a range between 0.395 and 0.415 μm, and the numerical aperture NA is applied in a range between 0.80 and 0.90. In this case, especially, the defocus margin is narrowed, but by using the focus servo of the present invention, it is possible to provide the stable system.

In current mastering technique, it is difficult to stably prepare a recording medium if the track pitch is 0.29 μm or less. Moreover, if a pickup is used in which the light source wavelength λ is 0.405 μm and the numerical aperture NA of the objective lens is 0.85, it is difficult to obtain a stable reproduction signal in a recording mark in which the shortest mark length is 0.138 μm or less. Obtaining the track pitch TP and the average run length period RL standardized on the basis of these limit values, the TP is 0.60 or more, and the RL is 0.86 or more. Especially, in the above-described ranges of the standardized track pitch TP and the standardized average run length period RL, if the range of the capture range CR [μm] of the focus servo satisfies $1.65 \leq CR \leq 3.02$, as described above, the enough defocus margin can be ensured even if there is a tolerance such as the spherical aberration, so that it is possible to provide the stable system.

In the above-described embodiment, the optical disc of the Blu-ray Disc having a 27 GB recording capacity is explained. However, the present invention can be applied regardless of the track pitch and the recording linear density of a recording medium, the encoding method, the type of the recording medium, or the like. Moreover, it can be applied not only to a rewritable type but also to a write once read many type and to a reproduce-only medium. Furthermore, it can be applied not only to a single recording layer but also to a multi-layer.

In this embodiment, the astigmatism method is taken for example as the focus error detection method. However, the present invention can be applied not only to the focus error detection method but also to other methods.

Although the optical disc is explained in the above-described embodiment, the present invention can be applied regardless of the shape of a medium, such as a card-shape recording medium and a solid recording medium.

(Optical Disc Recording/Reproducing Apparatus)

Figure 13:
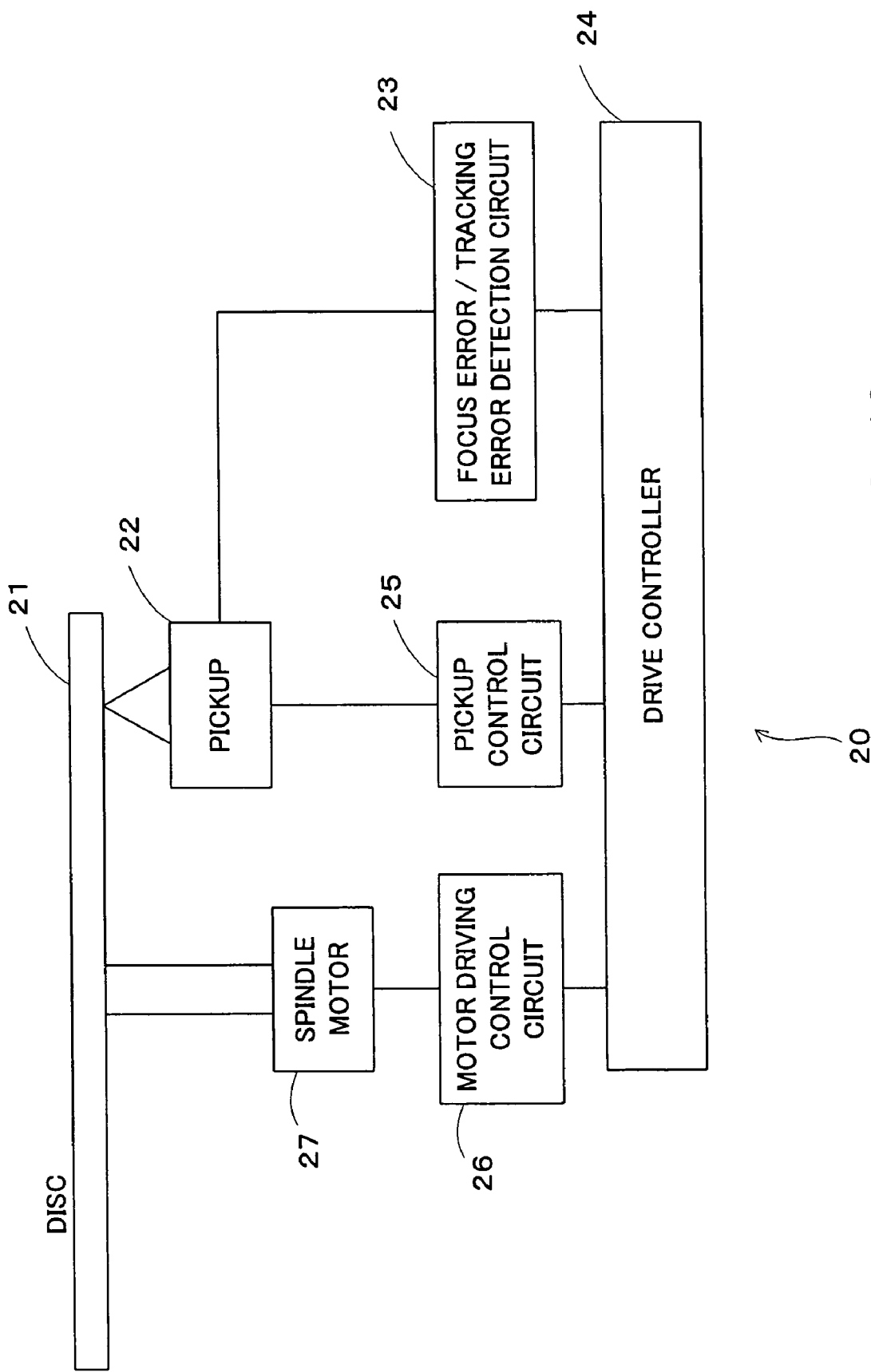
FIG. 13 is a schematic diagram showing one example of an optical disc recording/reproducing apparatus.

An optical disc recording/reproducing apparatus 20 associated with the present invention will be explained with reference to FIG. 13. A disc 21 has a surface runout or surface wobble within the range prescribed by the standard, and a pickup 22 has the above-described capture range to control the focus servo or the like.

A focus error signal and a tracking error signal from the pickup 22 can be detected by a focus error/tracking error detection circuit 23. There are a three spot method or the like as a detection method of detecting the tracking error signal, and the astigmatism method or the like as a detection method of detecting the focus error signal, but any method can be used. There is also a spindle servo for controlling the number of rotations to be the predetermined number of rotations. The error of the number of rotations may be obtained by a clock for a reproduction signal or a frequency generator provided for a motor.

On the basis of these error signals, the position of an objective lens of the pickup 22 is controlled by a drive controller 24 in a pickup control circuit 25 with respect to the focus servo and a tracking servo, and the rotation of a spindle motor 27 is controlled by a motor driving control circuit 26. Moreover, there is a positioning servo for determining the position of the pickup 22 in the radial direction of the optical disc by using a slider, and the position is controlled using position information of the pickup 22, a track address signal of the optical disc, and the like.

The focus servo device associated with the present invention is provided with the above-described capture range, and by applying this device for the optical disc of the Blu-ray Disc having a 27 GB recording capacity, it is possible to realize the focus servo and its stable lead-in.

Obviously, the optical disc recording/reproducing apparatus 20 to which the focus servo device associated with the present invention is applied is provided not only with the focus servo system, the tracking servo system, and the spindle servo system, but also with other mechanisms required for the optical disc recording/reproducing apparatus, such as a recording/reproducing signal processing system and a signal input/output system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-185251 filed on Jun. 25, 2002 including the specification, claims, drawings and summary is incorporated herein by reference in its entirety.

What is claimed is:

1. A focus servo device for focusing a light irradiated from a light source onto a recording medium surface via an objective lens, wherein a capture range to lead in focus is determined from:

a lower limit determined on the basis of an average run length period; and an upper limit determined on the basis of a track pitch.

2. The focus servo device according to claim 1, wherein, assuming that a wavelength of the light is $\lambda$, a numerical aperture of the objective lens is NA, the average run length period of the recording data normalized by $\lambda/NA$ is RL, the track pitch normalized by $\lambda/NA$ is TP, and the capture range of said focus servo device is CR [μm], the following equation applies:

$$0.114(RL-0.72)+0.84 \leq CR \leq 18000(TP-0.69)^5+3.13.$$

3. The focus servo device according to claim 2, wherein the following equation applies for the average run length period RL:

$$RL=2\times\{\text{integer part of }[(\text{average data inversion interval/channel bit length})+0.5]\}\times\text{channel bit length}\times NA/\lambda.$$

4. The focus servo device according to claim 3, wherein the wavelength $\lambda$ of the light ranges from 0.395 to 0.415 μm and the numerical aperture NA of the objective lens ranges from 0.80 to 0.90.

5. The focus servo device according to claim 4, wherein if the standardized track pitch TP is 0.6 or more and the average run length period RL is 0.86 or more, the following equation applies:

$$1.65 \leq CR \leq 3.02.$$

* * * * *